(12) United States Patent
Whiteside et al.

(10) Patent No.: US 9,664,909 B1
(45) Date of Patent: May 30, 2017

(54) MONOLITHIC OPTICAL BEAM SPLITTER WITH FOCUSING LENS

(71) Applicant: KLA-Tencor Corporation, Milpitas, CA (US)

(72) Inventors: Bret Whiteside, Gilroy, CA (US); Patrick Czarnota, Milpitas, CA (US); Juergen Reich, Campbell, CA (US); Sam Shamouilian, San Jose, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 308 days.

(21) Appl. No.: 13/940,130

(22) Filed: Jul. 11, 2013

Related U.S. Application Data (60) Provisional application No. 61/670,503, filed on Jul. 11, 2012.

(51) Int. Cl.
  *G02B 27/14* (2006.01)
  *G02B 27/10* (2006.01)

(52) U.S. Cl.
  CPC .................... *G02B 27/10* (2013.01)

(58) Field of Classification Search
  USPC ....................................... 359/638
  See application file for complete search history.

(56) References Cited

U.S. PATENT DOCUMENTS

| | | | |
|---|---|---|---|
| 4,712,205 A | 12/1987 | Smid et al. | |
| 6,141,101 A | 10/2000 | Bleier et al. | |
| 6,646,811 B2 * | 11/2003 | Inoguchi | G02B 17/0812 |
| | | | 359/630 |
| 6,680,794 B2 | 1/2004 | McClay et al. | |
| 6,867,435 B2 | 3/2005 | Sweatt et al. | |
| 6,888,988 B2 | 5/2005 | Vancoille et al. | |
| 7,198,416 B2 | 4/2007 | Ray et al. | |
| 7,769,295 B2 | 8/2010 | Sommer et al. | |
| 2007/0153402 A1 | 7/2007 | Destain | |
| 2008/0049190 A1 | 2/2008 | Destain et al. | |

* cited by examiner

*Primary Examiner* — Jack Dinh
(74) *Attorney, Agent, or Firm* — Dergosits & Noah LLP (57) ABSTRACT

A beam splitter includes first and second prisms. The first prism includes first, second, and third optical surfaces. The second prism includes three surfaces, one of which faces the second surface of the first prism and both transmit and reflect light. The first surface of the first prism is curved and forms a lens for focusing light either transmitted or reflected by the common interface between the two prisms. The first prism is from a single piece of material. Fabrication includes making two cuts through a lens to cut-out an intermediate section. A portion of the intermediate section is cut-off to form the third surface of the first prism. The first surface of the first prism corresponds to the curved top surface of the lens. The second surface of the first prism corresponds to the bottom plano surface of the lens. The first and second prisms are then combined.

11 Claims, 12 Drawing Sheets

MONOLITHIC OPTICAL BEAM SPLITTER WITH FOCUSING LENS

CROSS-REFERENCE TO RELATED APPLICATIONS

This patent application claims priority to U.S. provisional patent application 61/670,503, filed Jul. 11, 2012, which is incorporated by reference.

BACKGROUND

The present invention relates to the field of optics, including, more particularly, to an optical instrument and its fabrication.

Optical devices are found in a wide variety of devices ranging from cameras to laser systems. Optical devices process light waves and can be used to enhance an image for viewing, analyze the properties of light and other materials, determine a particular characteristic or property of a material, and make measurements—just to name a few examples.

A specific type of optical device is a beam splitter. A beam splitter is a device which splits a beam of light. Beam splitters are common components in metrology and process control including laser systems, inspection systems, fluorescence applications, optical interferometry, life science, and semiconductor instrumentation. In particular, beam splitters have applications in deep ultraviolet (DUV) illumination systems. Such systems can be used for wafer defect and surface quality inspection.

There is an ever increasing demand for precision optical equipment that offers better performance and more features, but can also be cost-effectively produced. There is a need to provide systems and techniques to produce a beam splitter with a focusing lens with a common surface in contact both for space constraints and for accuracy of alignment.

BRIEF SUMMARY OF THE INVENTION

In a specific embodiment, a beam splitter includes first and second optical elements. The first optical element in the form of a prism includes first, second, and third optical surfaces. The second optical element also in the form of a prism and includes three surfaces, one of which faces the second surface of the first prism and both transmits and reflects light. The first surface of the first prism is curved and forms a lens for focusing light either transmitted or reflected by the common interface between the two optical prism elements. The first optical element is from a single piece of material. Fabrication can include making two cuts through a lens to cut-out an intermediate section of the lens. A portion of the intermediate section is cut-off to form the third surface of the first optical element. The curved first surface of the first optical element corresponds to the curved top surface of the lens. The second surface of the first optical element corresponds to the bottom plano surface of the lens. The first optical element can be combined with the second optical element by optically contacting the second surface of the first optical element with the second surface of the second optical element.

In a specific implementation, a dichroic cube combiner lens (DCCL) is provided along with a novel fabrication method. The DCC is a cube beam splitter with a spherical lens fabricated into the glass of the top right angle prism which requires precise centering of the lens to a folded axis which is parallel to the base of a separate cube (made in a different process). Attachment of the two pieces requires some kind of bonding, either chemical (hydroxy-catalysis) if using Fused Silica or optical contacting if using Calcium Fluoride. Such bonded interfaces can trap contamination which can cause laser induced damage in high peak power, DUV laser illumination systems. This specific implementation provides for making the part out of one piece which substantially reduces the assembly time and eliminates the potential for lifetime issues. A new method for doing this out of one piece of glass is disclosed using a standard plano-convex lens.

In this specific implementation, a first step includes fabricating a plano-convex lens. In a specific embodiment, the lens diameter 49.794 mm, the center thickness (CT) is 14.973 mm, the material includes CaF2, and the radius of curvature is 28.186 mm. In another specific embodiment, the lens diameter is 47.316 mm, the CT is 14.495 mm, the material includes CaF2, and the radius of curvature is 26.55439 mm.

A second step includes cutting the side walls. In this specific implementation, these are non critical sides and will not be optically polished surfaces. The two cuts are 7 mm to the right and left of the vertex and are parallel to each other. A third step includes cutting the hypotenuse. In this step, with the center portion laying on its side a 45 degree cut is made to form the final part. The cut is made 15.262 mm from the corner. In another specific implementation, the cut is made 15.2 mm from the corner. A fourth step includes polishing a face that was just cut (see third step) and chamfering sharp edges.

A fifth step includes contacting onto a right angle prism. In particular, the fifth step includes optically contacting the right angle prism (RAP) to the upper lens prism. This can be performed on a fixture that can measure and control the distance from the lens vertex to the flat base (horizontal) surface (e.g., OptiCentric from TriOptics) to match the distance from the lens vertex to the folded (vertical) flat surface. The upper prism can be translated along the hypotenuse and optically contacted together without use of any adhesive on the backside of the HR coating to avoid UV exposure where the coating should be placed on the RAP to reduce cost of yield losses if surface figure is compromised. In another specific implementation, an adhesive is used. In this specific implementation, the upper prism can be slid along the hypotenuse and cemented together with low outgassing adhesive placed on the backside of the HR coating to avoid UV exposure.

In a specific implementation, a device includes a first optical element monolithically formed from a single piece of material having a first surface and a second surface, and a second optical element having a third surface adjacent the second surface of the first optical element that reflects or transmits an optical beam and, where the first surface of the first optical element is curved.

In another specific implementation, an optical assembly includes a first optical element that is monolithic having a first surface for receiving an incident optical beam, a second surface for emitting reflected light of the optical beam that is convex, and a third surface, and a second optical element of the same form as the first optical element having a first surface adjacent the third surface of the first optical element to transmit the incident optical beam into another concave surface of equal and opposite tilt to the first concave surface.

In another specific implementation, a method includes cutting out an intermediate section of a lens, the intermediate section thereby having a curved top surface from the lens, and a bottom surface from the lens, opposite the curved top surface, cutting off a part of the intermediate section to produce a first optical element, and assembling (e.g., combining) the first optical element with a second optical element.

Other objects, features, and advantages of the present invention will become apparent upon consideration of the following detailed description and the accompanying drawings, in which like reference designations represent like features throughout the figures.

DETAILED DESCRIPTION

Figure 1:
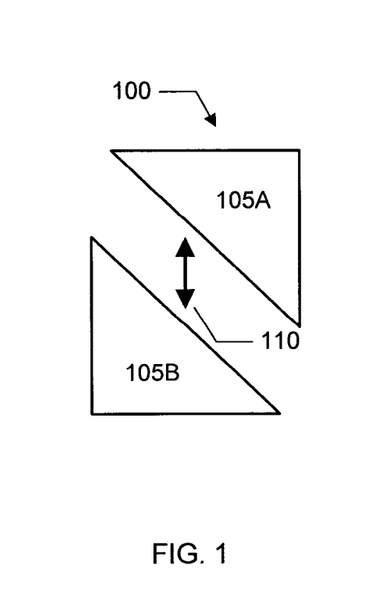
FIG. 1 shows a top view of two right angle prisms being combined to make a beam splitter cube.
Figure 2:
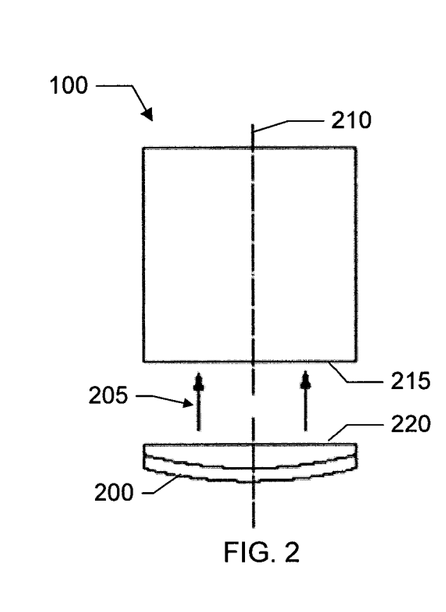
FIG. 2 shows a top view of a lens being attached to the beam splitter cube shown in FIG. 1.
Figure 3:
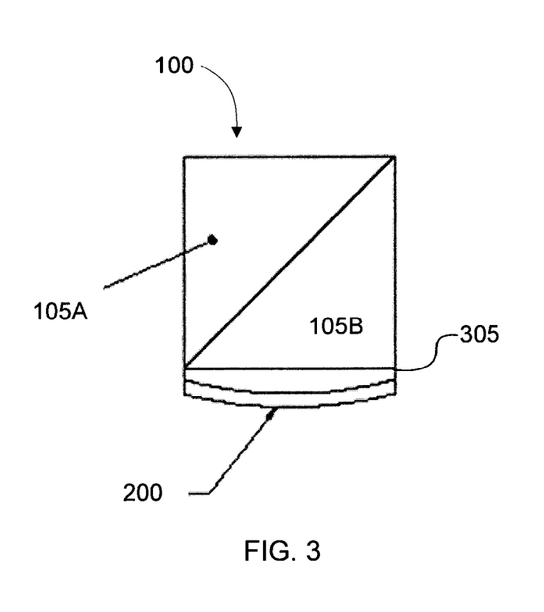
FIG. 3 shows a top view of the beam splitter cube having the lens attached.

FIGS. 1-3 show an example of attaching a lens to a beam splitter cube. In particular, FIG. 1 shows a top view of a beam splitter cube 100. The cube includes first and second prisms 105A-B which are brought together as shown by double-ended arrow 110 to form the cube. FIG. 2 shows a top view of a lens 200 being attached to a side of cube 100 as shown by arrows 205. A line 210 indicates a centerline through the cube and lens. FIG. 3 shows a top view of lens 200 having been attached to the side of cube 100. As shown in FIG. 3, this assembly is made up of three separate or individual parts, i.e., the first prism, second prism, and lens.

The approach shown in FIGS. 1-3 is to create two optical elements, a prism and a lens and bond the two together using mechanical reference features. These reference features can be hard to locate. The approach further has two or more surfaces to be polished and optically contacted together to reduce risk of deep ultraviolet (DUV) laser damage. Optically contacting is a difficult process and does not lend itself well to high-precision alignment since it fuses the surfaces instantaneously and does not fully "cure" over time. For example, as shown in FIG. 2, there is a surface 215 on the side of the cube and another surface 220 on the lens to be polished.

As shown in FIG. 3, there will be an adjoining interface 305 between the lens and cube. The interface has the potential to trap contamination. Trapping contamination is undesirable because the contamination could damage equipment, skew results (e.g., inaccurate measurements or readings), or combinations of these. For example, trapped contamination under high DUV laser fluence could cause laser damage.

This patent introduces a novel design for a beam splitter with focusing lens on one surface integrated into one monolithic lens element. This single piece avoids having to accurately align and bond two elements together where the beam splitter has no "optical axis" to define its centerline. This patent further describes how to fabricate such an optical element with a fewer number of cuts and polishing steps as compared to conventional techniques.

In a specific implementation, since the lens is the starting point for making the finished piece, all centering is relative to the vertex of this lens surface including the beam splitter fold surface. In this specific implementation, two components can be made from one monolithic component with the appropriate cuts to remove extraneous materials. Due to the difficulty in aligning and contacting the two components together, eliminating the interface between the two components enables the design to perform at a much higher level with the new method as compared to the old method.

The new design is overall more cost effective, since there a fewer surfaces to be polished and significantly less time is required for alignment as compared to conventional techniques. The new design has no glass-glass interface between the cube and lens thus eliminating trapping contamination which under high DUV laser fluence could cause laser damage. The new design has the potential to improve the overall accuracy of the lens centering with respect to the ideal fold axis of the cube beam splitter since all the machining operations can be done in the same setup used to polish the lens surface in the first place.

Figure 4:
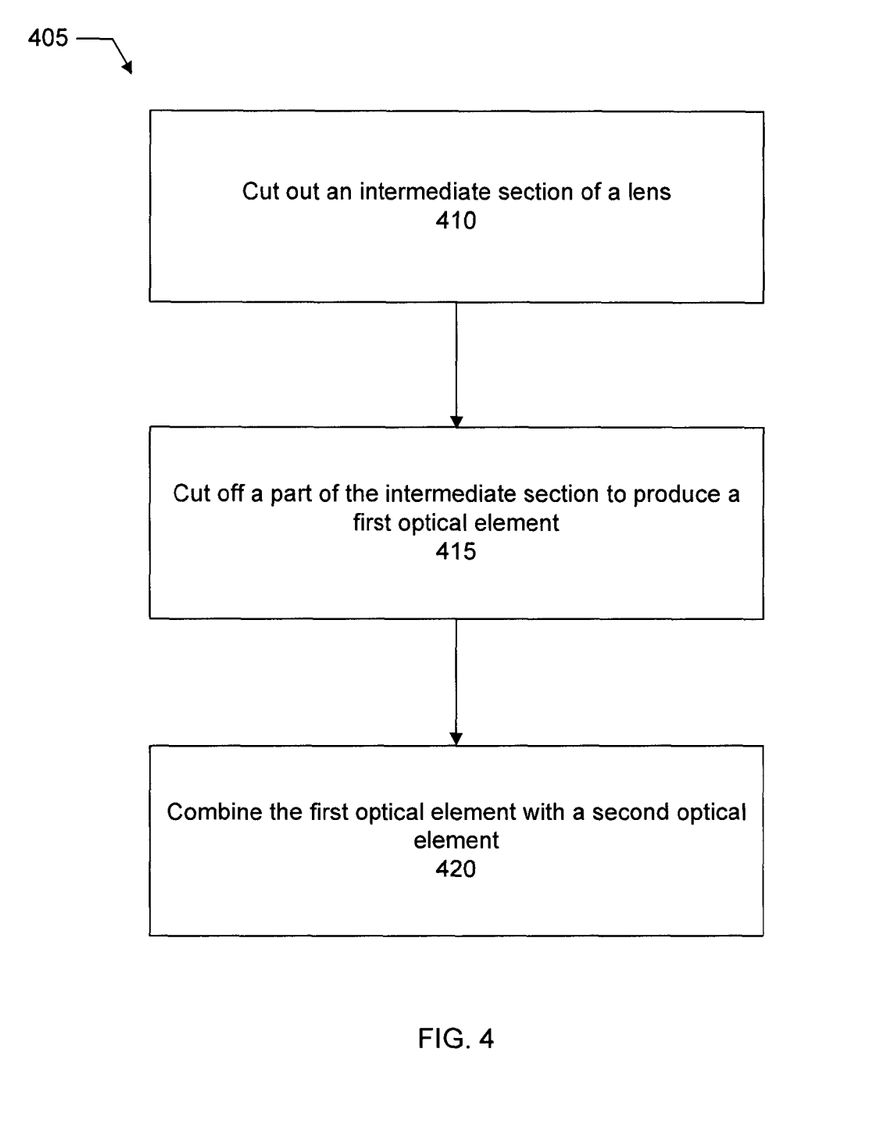
FIG. 4 shows an overall flow for fabricating a monolithic optical beam splitter with focusing lens.

FIG. 4 shows an overall flow 405 for manufacturing a monolithic optical beam splitter having a focusing lens. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In brief, in a step 410, an intermediate section of a lens is cut out. In a step 415, a part of the intermediate section is cut off to produce a first optical element. In a step 420, the first optical element is assembled or combined with a second optical element to produce an optical assembly, e.g., beam splitter with integrated lens.

Figure 5A:
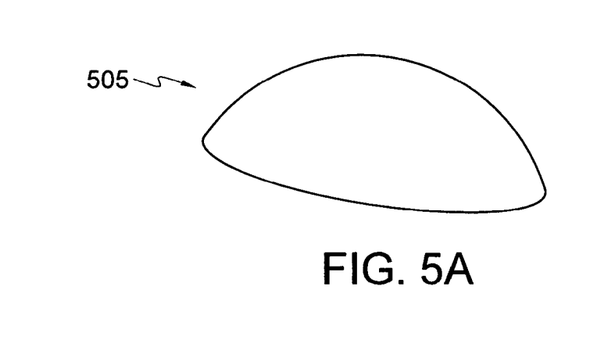
FIG. 5A shows a perspective view of a lens.
Figure 5B:
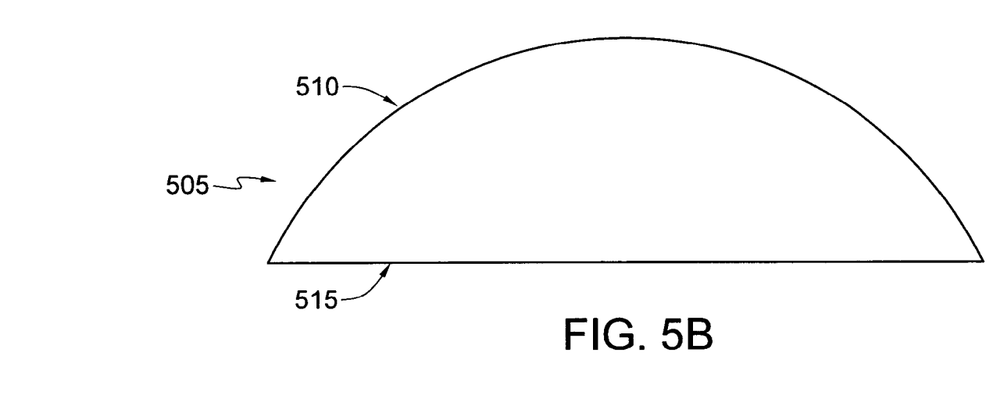
FIG. 5B shows a side view of the lens shown in FIG. 5A.

More particularly, in step 410 a lens is provided, obtained, or fabricated. FIG. 5A shows a perspective view of an example of a lens 505. FIG. 5B shows a side view of the lens shown in FIG. 5A. The lens includes a top surface 510, and a bottom surface 515, opposite the top surface. The lens has the shape of a dome. The bottom surface of the lens has a shape of a circle. In this example, the top surface is curved (e.g., curved convex) and the bottom surface is flat. A lens is an optical device which can focus or diverge light. For example, a lens can transmit and refract light, converging or diverging the beam. As light passes through a lens, it is affected by the lens' profile, substrate, or both.

There are many different types of lenses—any one of which may be suitable—depending upon the desired application. Some specific examples of lenses include plano-convex (PCX), double-convex (DCX), plano-concave (PCV), double-concave (DCV), achromatic, aspheric, and many others. In a specific implementation, the lens is made of calcium fluoride. The transmission of a calcium fluoride lens can range from about 1900 nanometer (nm) to about 7 micrometer (μm). A Knoop hardness of calcium fluoride is about 158.3. Other examples of materials for a lens include glass, plastic, germanium, silicon, zinc selenide, fused silica, or any type of material that is transparent, semi-transparent, or translucent. In a specific implementation, the lens is a plano-convex lens. In this specific implementation, a diameter of the lens is about 49.794 mm, a center thickness (CT) is about 14.973 mm, the lens material is calcium fluoride (CaF2), and the radius of curvature is about 28.186 mm. It should be appreciated, however, that the dimensions and lens material can vary depending upon factors such as the intended application, desired output, and others.

Figure 6:
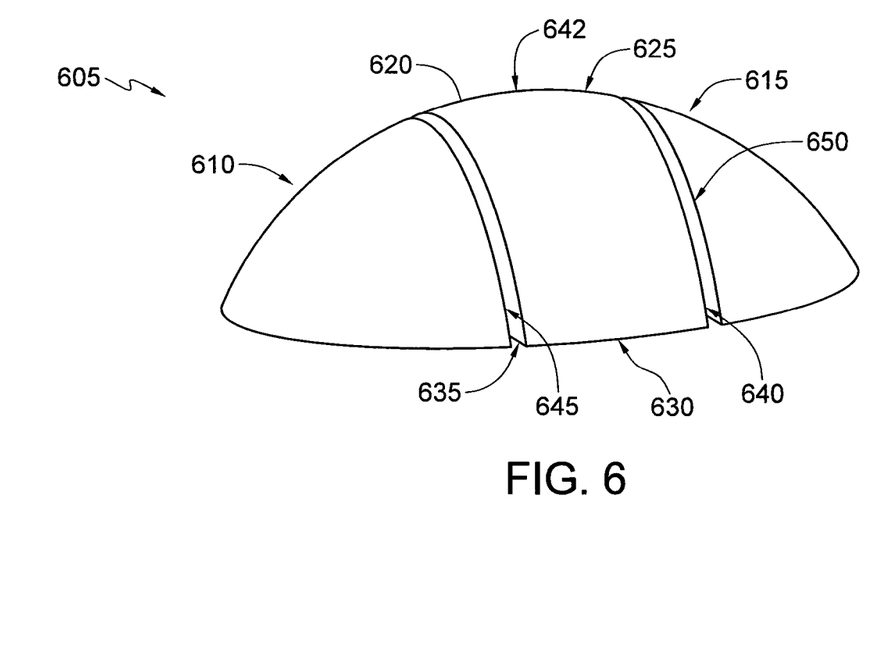
FIG. 6 shows a perspective view of the lens where an intermediate section as been cut out.

In a specific implementation, the lens is sectioned into thirds to make the non-polished sides of the beam splitter cube. For example, FIG. 6 shows a perspective view of a lens 605 having been sectioned, cut, or divided into three pieces. As shown in FIG. 6, there is a first end section 610, a second end section 615, and an intermediate section 620. The first and second end sections are opposite each other. The intermediate section is between the first and second end sections. The intermediate section may be referred to as a middle or center section.

The intermediate section includes a top surface 625, a bottom surface 630, a first side surface 635, and a second side surface 640. The intermediate section may include a center or reference point 642 that corresponds to a vertex of the lens. A principle axis of the lens may pass through point 642. The top and bottom surfaces are opposite each other. The first and second side surfaces are opposite each other. The top surface of the intermediate section is curved (e.g., curved convex). In particular, the top surface of the intermediate section represents or corresponds to a portion of the curved top surface of the lens. The bottom surface of the intermediate section represents or corresponds to a portion of the bottom surface of the lens.

A thickness of the intermediate section as measured from point 642 to the bottom surface of the lens may correspond to the center thickness of the lens. The width of the intermediate section as measured from the first side surface to the second side surface may be based on a length or side dimension of the second optical element. For example, in a specific implementation, the second optical element includes a right angle prism (RAP) having a first edge, a second edge adjacent to the first edge, and a hypotenuse extending between the first and second edges. Lengths of the first and second edges are the same. The width of the intermediate section is equal or substantially equal to the length of the first (or second) edge of the prism.

In this specific implementation, the first side surface of the intermediate section is formed from making a first cut 645 through the lens. The second side surface of the intermediate section is formed from making a second cut 650 through the lens. Cutting out the intermediate section may include making the first cut along a first plane to divide the lens into a first end remainder piece and a remaining piece. Cutting out the intermediate section may further include cutting through the remaining piece along a second plane to divide the remaining piece into a second end remainder piece and the intermediate section. In a specific implementation, the first plane is parallel to the second plane. The first plane, second plane, or both may be perpendicular to the bottom surface of the lens. The first end remainder piece may be a mirror image of the second end remainder piece. A distance from reference point 642 to the first side surface may be the same as a distance from the point to the second side surface.

In a specific implementation, the first and second cuts are made about 7 mm to the right and left of the vertex and are parallel to each other. It should be appreciated, however, that the intermediate section may be cut along any desired geometry and according to any desired dimension. For example, in another specific implementation, the first plane may not be parallel to the second plane. The first plane, second plane, or both may not be perpendicular to the bottom surface of the lens. The first end remainder piece may not be a mirror image of the second end remainder piece. A distance from reference point 642 to the first side surface may different from a distance from the point to the second side surface. In a specific implementation, the side walls formed from making the first and second cuts are non-critical sides and thus do not have to be optically polished. Not having to polish a surface helps to reduce fabrication costs.

Figure 7A:
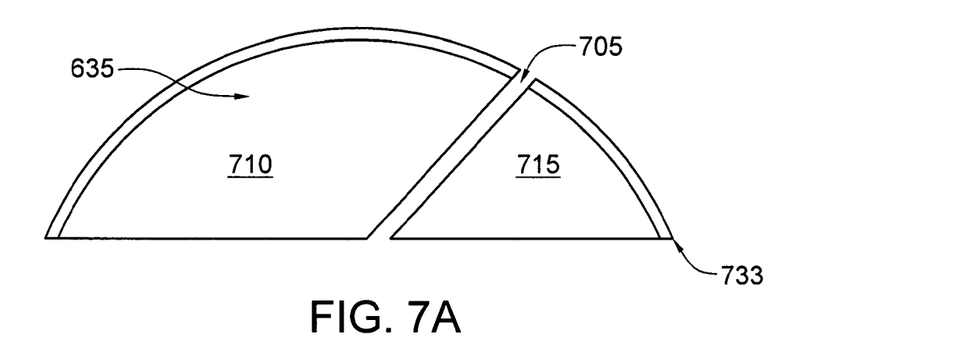
FIG. 7A shows a side view of the intermediate section where a part of the section has been cut off to produce a first optical element.

In step 415 (FIG. 4), a part of the intermediate section is cut off to produce a first optical element. In a specific implementation, an end of the intermediate section is cut off and a surface is polished to create a right angle of the lens/cube. For example, FIG. 7A shows a side view of the intermediate section. In the example shown in FIG. 7A, a third cut 705 has been made through the intermediate section to divide the intermediate section into a third remainder piece 710 and a fourth remainder piece 715, the fourth remainder piece being the first optical element. Any technique or combination of techniques suitable for cutting a lens may be used. For example, a lens may be cut using a table saw, jig saw, router, mill, laser, or water jet.

Figure 7B:
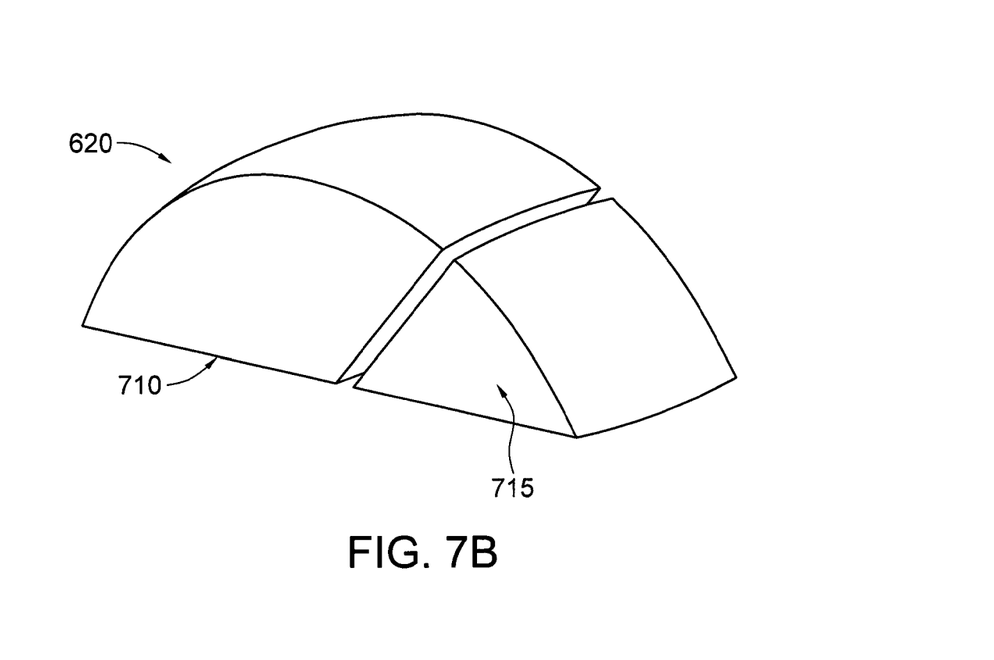
FIG. 7B shows a perspective view of the intermediate section shown in FIG. 7A.

In this specific implementation, the intermediate section is placed so that it lies on its side and a 45 degree cut is made to form the first optical element. In this specific implementation, the cut is made about 15.262 mm from corner 733 as shown in FIG. 7A. It should be appreciated, however, that the cut may be made at any distance from the corner depending upon factors such as the intended application, desired output, lens diameter, right angle prism dimensions, and others. FIG. 7B shows a perspective view of the intermediate section having been cut to form the first optical element.

Figure 8A:
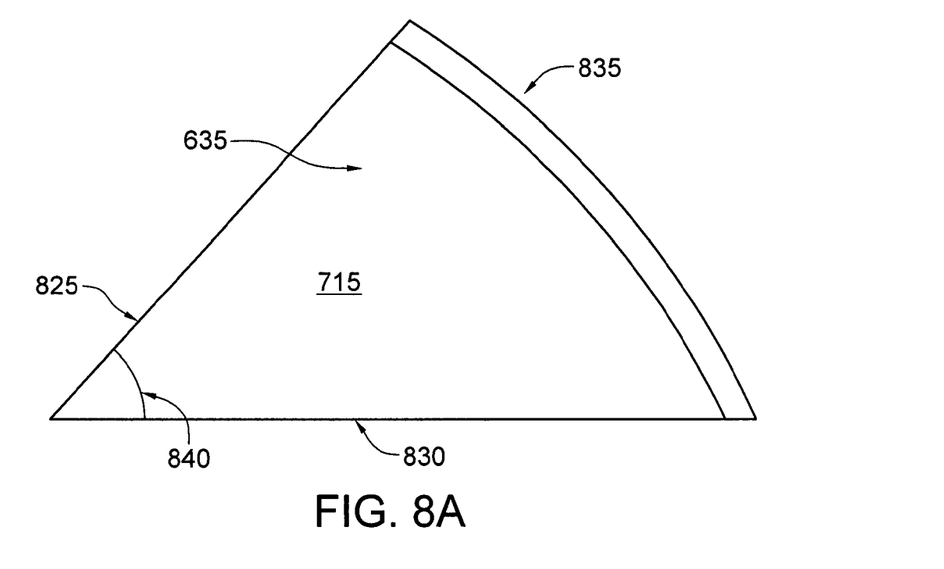
FIG. 8A shows a side view of the first optical element.

FIG. 8A shows an enlarged side view of the first optical element. The first optical element includes first, second, third surfaces 825, 830, and 835, respectively, and a first angle 840 between the first and second surfaces. There can also be two additional unique angles for the other two corners depending on the choice of lens center thickness from the lens vertex 642 (FIG. 6) to the arbitrary bottom surface of the lens, and the angle of the third cut 705 (FIG. 7A) of the intermediate section of the lens.

First surface 825 is formed from the third cut. Second surface 830 corresponds to a portion of the bottom surface of the lens. Third surface 835 corresponds to a portion of the curved top surface of the lens. The third cut may be along a third plane perpendicular to the first side surface of the intermediate section, the second side surface of the intermediate section, or both. In a specific implementation, first angle 840 is about 45 degrees. The first angle, however, can vary depending upon factors such as the desired fold angle, application, and others. For example, the first angle may range from about 10 degrees to about 90 degrees. This includes, for example, 20, 30, 40, 50, 60, 70, 80, or 89 degrees. The first angle may be less than 10 degrees. The first angle may be greater than 90 degrees.

Figure 8B:
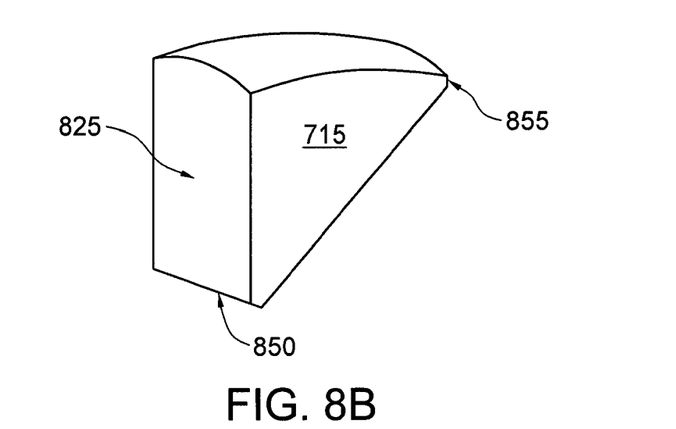
FIG. 8B shows a perspective view of the first optical element.

In a specific implementation, the first optical element is further processed by polishing the face that was just cut (e.g., first surface 825—FIG. 8A) and adding chamfers to two sharp edges. For example, FIG. 8B shows a perspective view of first optical element 715 after polishing and chamfering operations. In this example, first surface 825 has been polished. A first chamfer 850 has been made to a first edge of the first optical element. A second chamfer 855 has been made to a second edge of the first optical element, opposite the first edge. In a specific implementation, the first edge, second edge, or both edges are chamfered to about 0.75 mm. The chamfer helps to provide space for height adjustment in a later step. Furthermore, a chamfer can help to reduce the chipping, cracking, or breaking of a sharp edge such as during handling. The polishing operation, chamfering operation, or both may include sanding, grinding, applying chemicals, applying an abrasive paste or compound, rubbing, media blasting, lapping, or any other competent technique, or combinations of techniques.

Figure 9:
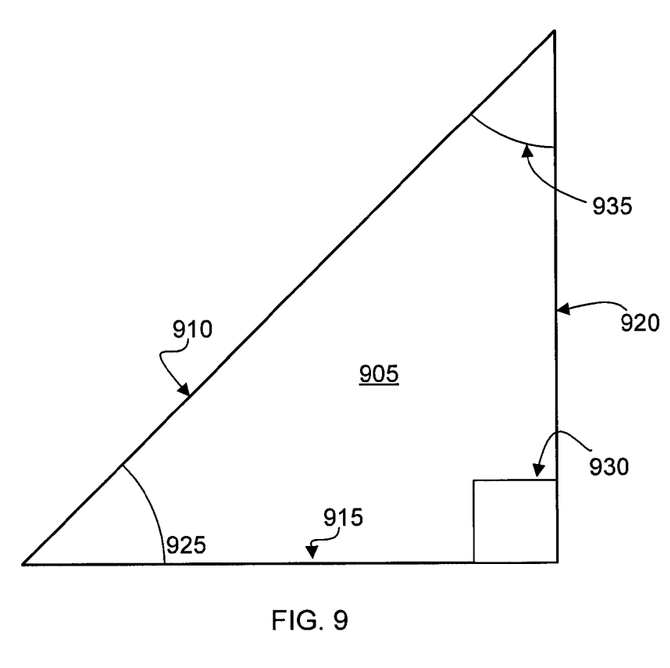
FIG. 9 shows a side view of a second optical element.

In a step 420 (FIG. 4), the first optical element is combined with a second optical element. FIG. 9 shows a side view of a second optical element 905. The second optical element includes fourth, fifth, and sixth surfaces 910, 915, and 920, respectively, and fourth, fifth, and sixth angles 925, 930, and 935, respectively.

In a specific implementation, the second optical element is a right angle prism. For example, an edge of fourth surface 910 can correspond to a hypotenuse of a right angle triangle. An edge of fifth surface 915 can correspond to a first leg of the right angle triangle. An edge of sixth surface 920 can correspond to a second leg of the right angle triangle. The fourth angle is about 45 degrees. The sixth angle is about 45 degrees. The fifth angle is about 90 degrees. The fourth angle is the same as the sixth angle. The fifth angle is equal to a sum of the fourth and sixth angles. A length of the hypotenuse squared is equal to a length of the first leg squared plus a length of the second leg squared.

It should be appreciated, however, that the second optical element can be any type of prism depending upon the desired application. Some specific examples of other types of prisms include corner cube, hollow cube, dichroic, cross dichroic, Philips type, RGB, Kestrer type dichroic, total internal reflection, triangular, equilateral triangle, penta, porro, roof, amici, penta roof, Schmidt, dove, rhomboid, polygon, beam shaping, and wedge—just to name a few examples.

Figure 10A:
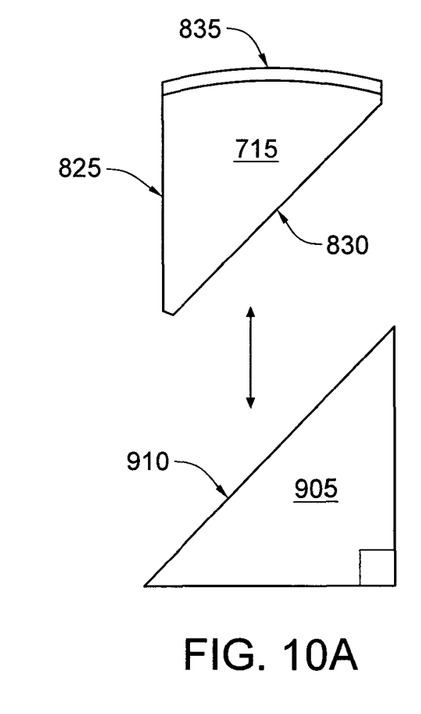
FIG. 10A shows the first and second optical element being combined to make a beam splitter with focusing lens.
Figure 10B:
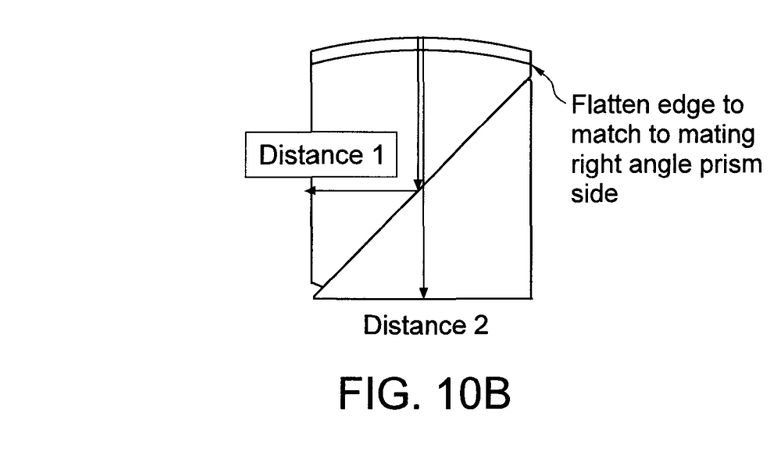
FIG. 10B shows a side view of the first and second optical elements having been combined to make the beam splitter with focusing lens.
Figure 11:
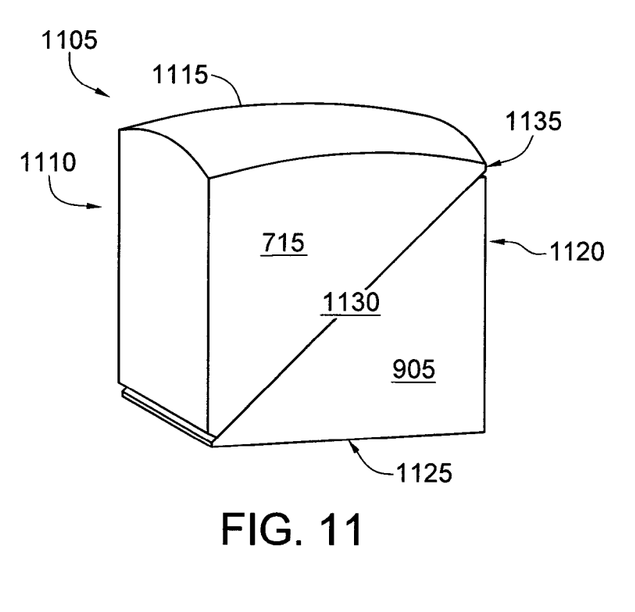
FIG. 11 shows a perspective view of the first and second optical elements having been combined to make the beam splitter with focusing lens.
Figure 12:
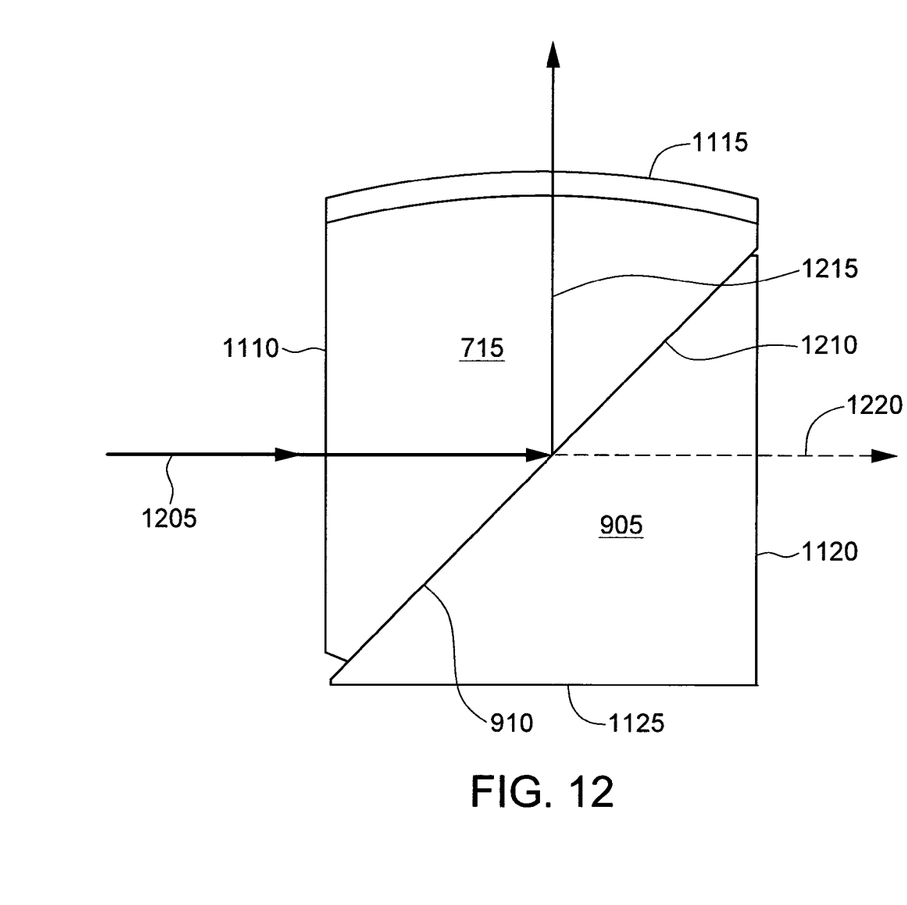
FIG. 12 shows a path of a beam of light through the beam splitter.

FIG. 10A shows a side view of first optical element 715 being combined with second optical element 905. FIG. 10B shows a detailed side view of a specific implementation for combining the first and second optical elements. FIG. 11 shows a perspective view of the first and second optical elements having been combined to make a beam splitter 1105 having an integrated lens. FIG. 12 shows a side view of the beam splitter and a path of an optical beam.

Referring now to FIGS. 10A and 10B, in a specific implementation, combining the first and second optical elements includes optically contacting the second optical element to the first optical element. In a specific implementation, the first optical element may be referred to as the upper lens prism. The second optical element may be referred to as the right angle prism (RAP). Combining the two elements can include positioning the first and second optical elements such that second surface 830 (FIG. 8A) of the first optical element faces fourth surface 910 (FIG. 9) of the second optical element. In a specific implementation, the surfaces are placed adjacent, against, or in contact with each other, e.g., optically contacted.

More particularly, in this specific implementation, the combining is performed on a fixture that can measure and control the distance from the lens vertex to the flat base (horizontal) surface to match the distance from the lens vertex to the folded (vertical) flat surface. One example of a fixture that can be used is a product referred to as OptiCentric® and provided by TriOptics. As shown in FIG. 10B, the first optical element (or upper prism) can be translated along the hypotenuse so that chamfered or flatten edge 855 matches to mating right angle prism side. In a specific implementation, the two elements are optically contacted together without use of any adhesive on the backside of the HR coating to avoid UV exposure where the coating should be placed on the second optical element (or RAP) to reduce cost of yield losses if the surface figure is compromised.

In other words, in this specific implementation, the first and second optical elements are bonded together without using adhesives. Instead, van der Waals forces hold the first and second optical elements together. In another specific implementation, an adhesive may be used. In this specific implementation, the first optical element (or upper prism) can be slid along the hypotenuse and cemented together with low outgassing adhesive placed on the backside of the HR coating to avoid UV exposure. In another specific implementation, the first optical element may be flipped so that first surface 825 is optically contacted with fourth surface 910. The contacting may or may not include the use of adhesives.

Referring now to FIG. 11, beam splitter 1105 includes first, second, third, fourth, fifth, and sixth faces, 1110, 1115, 1120, 1125, and 1130, respectively (the sixth face is not shown). The first face is opposite the third face. The second face is opposite the fourth face. The fifth face is opposite the sixth face. In a specific implementation, the first face corresponds to first surface 825 of the first optical element (see FIG. 8A). The second face corresponds to third surface 835 of the first optical element. The third face corresponds to sixth surface 920 (see FIG. 9) of the second optical element. The third face may include chamfered edge 855 of the first optical element. As discussed above, the chamfer helps to avoid or reduce chipping the section of the lens which is removed where two surfaces come to a sharp edge easily broken off during handling.

FIG. 12 shows a side view of the beam splitter shown in FIG. 11. A path of an optical beam such as a beam of light (e.g., laser) 1205 is through first face 1110, reflected at an interface 1210 formed between first and second optical elements 715 and 905, and emitted out curved second face 1115. The light emitted from the curved or second face may be at or near a center of the curved center face. In particular, a first portion or segment 1215 of the beam may be reflected off surface 910 of the second optical element (e.g., the hypotenuse face) and a second portion 1220 of the beam may be transmitted through the second optical element and emitted out third face 1120. The beam entering the first face may be referred to as the incident beam. The first portion of the beam may be referred to as the reflected beam. The second portion of the beam may be referred to as the transmitted beam.

As shown in FIG. 12, the first portion of the beam can exit the third face 1115 without crossing an interface. There is no gap (e.g., gap of air) between the second face of first optical element 715 and the third face 1115 because first optical element 715 is a monolithic component. That is, the first optical element (having curved third face 1115 and first face 1110) is a single, one-piece part or structure. The first optical element is made from a portion of the lens. There is no adjoining interface (e.g., glass-glass interface) between the second face and the third face 1115. The elimination of such an interface is beneficial because reduces or eliminates trapping contamination which under high DUV laser fluence could cause, among other things, laser damage.

Some benefits of the techniques described in this patent include using a single monolithic lens to tightly control the beamsplitter fold axis with respect to a defined center of curvature of a lens. More particularly:

a. Spherical lens surface and thickness to back side plano surface can be very tightly controlled to achieve tight tolerances on both lens and prism thicknesses in one operation.

b. Centering of lens axis to prism fold axis is virtually guaranteed by controlling above center thickness of "hyper-hemispherical" lens (which has an axis which is not contained in finished part but acts as surrogate measurement for final part dimensions).

c. Two of the three cuts into the above lens are not critical optical surfaces and therefore only need to be roughed in to final size to avoid clipping outer edges of internal beam if undersized or obscuring inner edges of external beam collected around beam splitter lens assembly. For example, referring now to FIGS. 6-7B, in a specific implementation first and second cuts 645 and 650 may be more roughly cut than third cut 705 because it will be the third cut that forms the receiving face 1110 (FIG. 12) for the incident light beam rather than the first or second cuts.

Cost savings may be achieved by using a less precise (but less costly) saw blade to make the first and second cuts as compared to the third cut. For example, a first type of blade may be used to make the first cut, second cut, or both. A second type of blade, different from the first type of blade, may be used to make the third cut. The first type of blade may be less expensive than the second type of blade. The first and second cuts may be made with less precision (but made more quickly) as compared to the third cut. The first cut, second cut, or both may be made using a first type of cutting machine. The third cut may be made using a second type of cutting machine, different from the first type of machine. The first machine may be less expensive (e.g., less expensive to operate) than the second type of machine. The second type of machine may have greater precision and accuracy as compared to the first type of machine.

d. The base right angle prism (RAP) which encloses the beam splitter fold surface into a convenient cubic shape can be made to match exactly the center thickness error of the cut up beam splitter lens component. This can be done by translating the RAP along the common fold axis until either an interferometer or other optical center thickness probe returns two identical reflected beams both in focus simultaneously. The actual distance between the lens vertex to either or both flat prism faces can be measured precisely along the lens axis and perpendicular to these prism faces. This could not be done if made as a cube assembly before integrating with the lens since the cube has no defined optical axis/centerline to measure along.

Other benefits regarding monolithic, DUV optics include:

a. Monolithic assemblies can be made cheaper and faster where special grades of crystalline and amorphous materials require high cost of ownership.

b. Single part (e.g., first optical element 715—FIG. 12) will not degrade as quickly under high laser fluence as two pieces joined together.

c. Crystalline (CaF2) optics for high DUV laser damage threshold are optically contacted (adhesive free bonded together) which makes active alignment extremely difficult to perform, thus monolithic assemblies do not require active alignment or contacting where adjoining interfaces are eliminated and combined into one piece.

d. Accuracy of raw element can exceed that of aligned assembly thus improving performance/integrity of such a monolithic assembly especially for DUV wavelengths (266, 248, 193) where optical component dimensional errors lead to poor system performance.

Further, extremely small optics can be made from much larger optics that have been cut into smaller pieces. This allows for more conventional spherical surface polishing techniques to be utilized for achieving good surface figure and controlling critical center thicknesses of final section removed from work piece. Combining beam splitters with short focal length lenses can simplify the way in which small single spot or flood illumination inspection tools can be tightly packaged and "aligned by design" rather than with custom fixtures and mounted to the bottom of collection optics with precise coincidence errors between illumination and collection FOV's.

One specific example of the new design would be integrating the monolithic beam splitter/lens component into a collection objective lens by mounting the base RAP directly to the bottom of one of the collector lens elements. This avoids requiring more mechanical struts to hold the beam splitter/lens on the optical axis of the collector objective further blocking the scattered radiation from the wafer surface being measured for surface quality and surface defects. The assembly makes for a very small package with very tight tolerances which are controlled at the parent lens level rather than at the much smaller form factor of the finished assembly. Currently, the cubes and lenses are made in two separate fabrication operations and only combined into one piece by the aid of some custom gauge blocks/pins to mechanically register the edges of one part to match that of the other part (where there is no guarantee that the part tolerances match up when made separately).

In a specific implementation, a new method uses a larger lens which can be made more precisely than a smaller subaperture lens by virtue of its near hemispherical shape with a backside polished to represent the fold surface of the beam splitter. Now the perpendicular distance from flat to lens vertex can be measured with the aid of a focusing autocollimator or height gauge until the thickness matches that of the design beam splitter/lens assembly. Now two non-critical surfaces are cut to remove unwanted material from the assembly (see, e.g., first and second cuts 645,

650—FIG. 6) and one more cut for the critical perpendicular prism surface is made (see, e.g., third cut 706—FIG. 7A).

This surface (e.g., surface 825 (FIG. 8A) formed from third cut 705 (FIG. 7A)) is then polished either before or after a secondary RAP component (e.g., second optical element 905—FIG. 9) is attached to the bottom of the beam splitter/lens until the folded beam path length matches that of the design or the base RAP component if already attached. If the prism face is polished before the base RAP component is attached, the resulting path length can be precisely matched to that of the base RAP component by translating the latter until the folded and unfolded beam paths exactly match as measured from lens vertex to prism flat(s). For example, in a specific implementation, a method includes after cutting off a part of the intermediate section to produce the first optical element (step 415—FIG. 4), polishing a surface formed from the cutting. The polishing may be before or after combining the first optical element with the second optical element (step 420—FIG. 4).

In a specific embodiment, a size of lens radius of curvature (ROC) is 28 millimeters (mm), a subaperture lens center thickness is 2.5 mm, and final cube dimensions of 14×14×14, provides for starting with a singlet lens made with the same ROC, 50 mm in diameter, and having 15 mm center thickness. It is estimated that two beam splitter/lens assemblies can be made from each singlet lens thus further reducing the amount of set up and fabrication cycle time to make each assembly. For example, referring now to FIG. 7A, a fourth cut may be made through piece 710 to obtain another optical element to be combined with, for example, another prism. The fourth cut may be along a plane that is perpendicular to the bottom surface of the lens. The other optical element may be a duplicate of first optical element 715 or may have different dimensions as desired.

Figure 13:
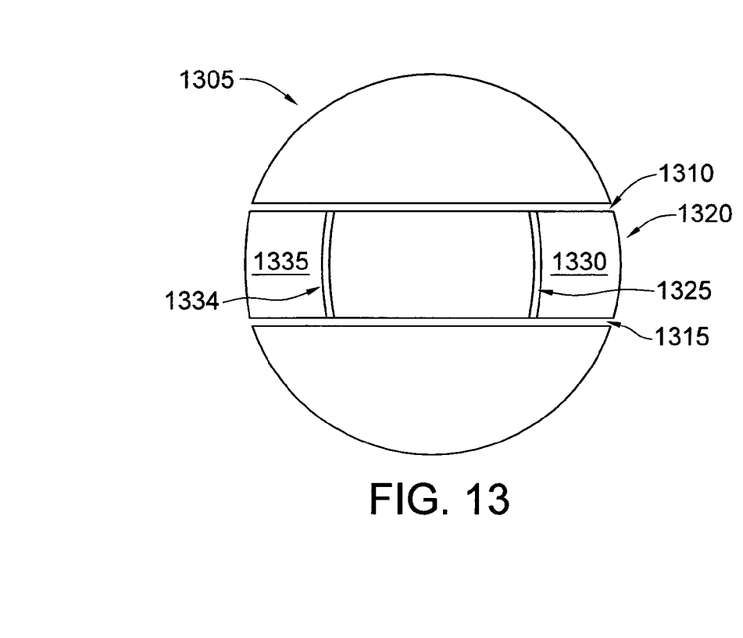
FIG. 13 shows a top view of a single lens having been cut to make parts for two separate beam splitters with focusing lenses.
Figure 14:
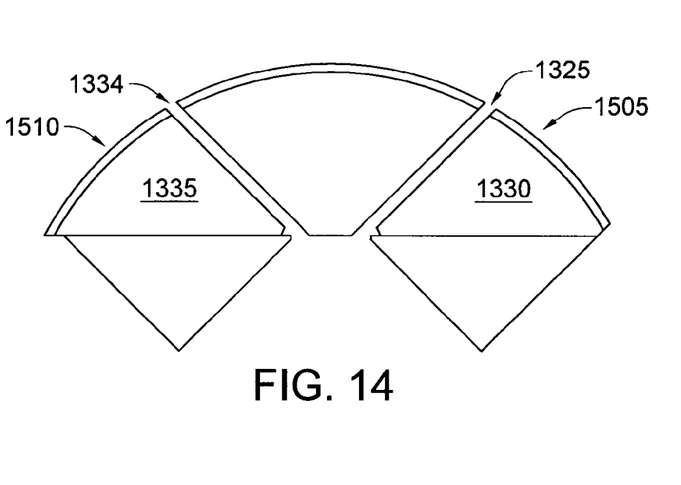
FIG. 14 shows a side view of an exploded parts diagram of using the single lens to make parts for two separate beam splitters with focusing lenses.
Figure 15:
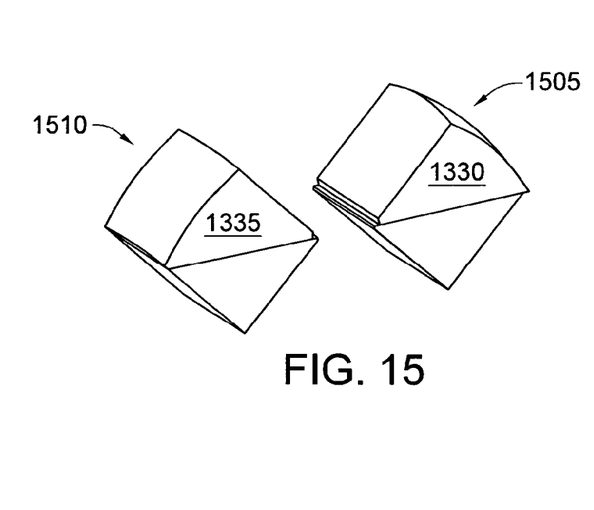
FIG. 15 shows perspective views of two separate beam splitters, each having a focusing lens made from a single lens.

More particularly, FIGS. 13-15 show a specific implementation of a technique for fabricating two beam splitters, first and second beam splitters 1505 and 1515 (FIG. 15) each having an integrated lens from a single lens. That is, based on the geometry and material needed for removal, two full prisms with lens parts can be extracted from one lens. The right angle prisms without lens can be made separately and bonded into place with or without an adhesive. For example, FIG. 13 shows a top view of a lens 1305. First and second cuts 1310 and 1315 have been made to cut out an intermediate section 1320. A third cut 1325 has been made to form a first or upper lens prism 1330 for first beam splitter 1505 (FIG. 15). A fourth cut 1334 has been made to form a second upper lens prism 1335 for second beam splitter 1510 (FIG. 15). FIG. 14 shows a side view of an exploded parts diagram including first and second beam splitters 1505 and 1510. As shown in FIG. 14, the first beam splitter includes first upper lens prism 1330. The second beam splitter includes second upper lens prism 1335. The first and second upper lens prisms are formed from a single or the same lens 1305 (FIG. 13).

Figure 16:
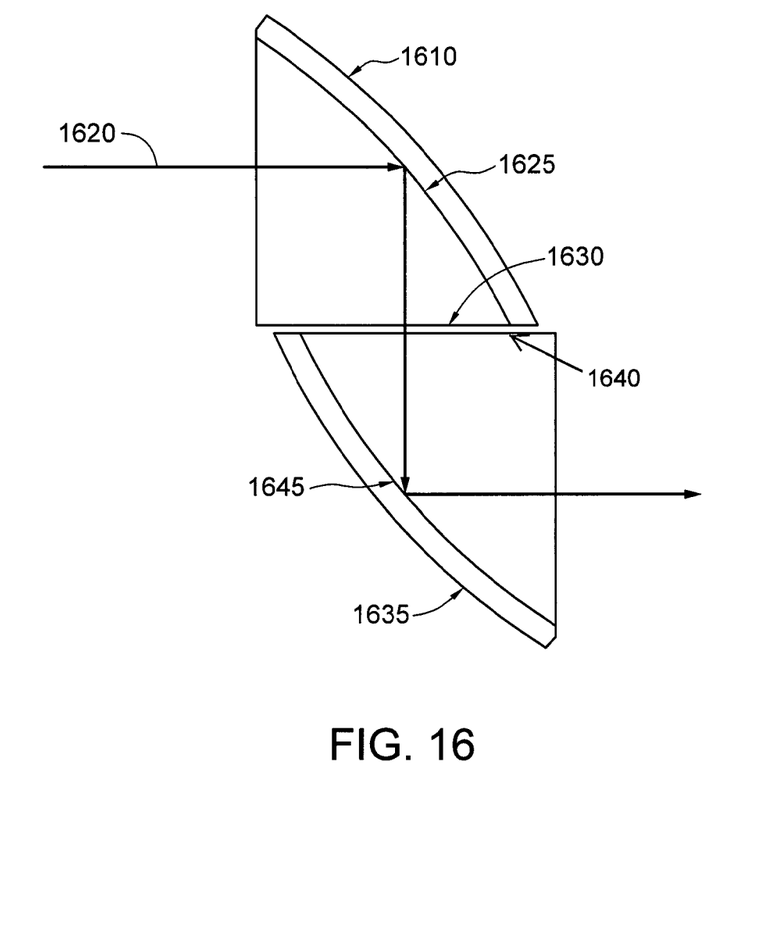
FIG. 16 shows a side view of another specific embodiment of an optical instrument.

FIG. 16 shows a side view of another specific embodiment of an optical device 1605. In this specific embodiment, there is a first optical element 1610 that is monolithic having a first surface 1615 for receiving an incident optical beam 1620, a second surface 1625 for emitting reflected light of the optical beam that is convex, and a third surface 1630. There is a second optical element 1635 of the same form as the first optical element having a first surface 1640 adjacent the third surface of the first optical element to transmit the incident optical beam into another concave surface 1645 of equal and opposite tilt to the first concave surface. In a specific implementation, the first and second optical elements may be formed from a single or the same lens. The first and second optical elements may be identical. Alternatively, based on factors such as the intended application, one or more dimensions of the first optical element may be different from corresponding one or more dimensions of the second optical element.

The techniques discussed in this patent provide for the ability to fabricate a very expensive beam splitter cube and lens assembly without requiring special tooling to actively align the two optical components. Such tooling is very expensive and time consuming to design and fabricate, and once built requires a lot of special setup and calibration to perform the alignment accurately. Therefore, use of precision lens fabrication techniques to avoid custom jigs and alignment benches is very advantageous to making DUV illumination systems more robust, cost effective, and better performing.

It should be appreciated that many types of spherical surface curvatures can be implemented if needed to produce beam splitters having different focal lengths. For example, depending upon the desired application, the fold surface does not have to be 15.26 mm with respect to the incident cube face as measured tangent to the lens surface from corner to corner, thus a constant size cube can be made with a variety of different lens focal lengths.

The lens and prism shown in FIGS. 5A-16 are merely examples used to show a particular implementation. One of skill in the art will recognize that principles and aspects of the technique can be applied to many different types of lenses and prisms.

For example, depending upon the application a lens, prism, or both may or may not include a coating. Some examples of coatings include antireflective (AR) coatings (e.g. single-wavelength/multi-layer anti-reflection or "V" coating, broadband antireflection (BBAR) single layer antireflection (SLAR) (e.g., magnesium fluoride)), high-reflective (HR) coatings (e.g., UV laser-line Rmax high reflection, VIS/NIR laser-line Rmax high reflection (LHR), IR laser-line Rmax high reflection, VIS/NIR broadband Rmax high reflection (BHR), multi-wavelength Rmax high reflection (MHR), UV partial reflection (PAR), VIS/NIR partial reflection, IR partial reflection), metallic or hybrid coatings (e.g., bare aluminum (BAL), protected aluminum (PAL), enhanced aluminum (EAL), protected silver (PAG), enhanced silver (EAG), bare gold (BAU), protected gold (PAU), or enhanced gold (EAU))—just to name a few examples.

Factors to consider when selecting the type of lens, prism, or both include the type of light or laser source, angle of incidence, reflectance, damage threshold, wavelength, and others. Depending upon the application, there may be substrate, material, filter, film, resin, adhesive, coating, plate, polarizer, layer, or combinations of these placed between first and second optical elements 715 and 905 (FIG. 12).

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A device comprising:
    a first optical element monolithically formed from a single piece of material as a first substantially triangular prism having two triangular planar sides, a first planar surface, a second planar surface, and a third curved surface, wherein the second planar surface is opposite a first angle formed by the first planar surface and the third curved surface; and
    a second optical element formed as a second substantially triangular prism and having two triangular planar sides, a first planar surface, a second planar surface, and a third planar surface, wherein the second planar surface of the second optical element is opposite a second angle formed by the first planar surface and the third planar surface of the second optical element;
    wherein the device is configured such that a substantial portion of the first optical element second planar surface is held closely adjacent or in contact with a substantial portion of second optical element second planar surface to both transmit and reflect an optical beam, and such that, in a plane parallel to the first optical triangular planar sides and parallel to the second optical element triangular planar sides, the device has a substantially quadrilateral cross section.

2. The device of claim 1 wherein the third curved surface of the first substantially triangular prism is convex.

3. The device of claim 1 wherein an angle of about 45 degrees is formed between the first planar surface and the second planar surface of the first substantially triangular prism.

4. The device of claim 1 wherein a path of an optical beam of light is through the first substantially triangular prism, reflected at an interface between the first and second substantially triangular prisms, and out the third curved surface of the first substantially triangular prism, wherein a segment of the path between the interface and the third curved surface of the first substantially triangular prism does not cross another interface.

5. The device of claim 1 wherein there is no gap of air between the third curved surface and the second planar surface of the first substantially triangular prism.

6. The device of claim 1 wherein the first substantially triangular prism comprises calcium fluoride.

7. The device of claim 1, further comprising:
    the first substantially triangular prism being formed from an intermediate section of a monolithic lens having a curved top surface and a flat bottom surface, by a first cut and a second cut of the monolithic lens to form the two triangular planar sides of the intermediate section, and by a third cut at one end of the intermediate section along a plane perpendicular to at least one of the two triangular planar sides which cuts a first end portion off of the intermediate section, the resulting first end portion being the first substantially triangular prism having the two triangular planar sides, the first planar surface formed by the third cut, the second planar surface formed from the lens flat bottom surface, and the third curved surface formed from the lens curved top surface; and
    the second planar surface of the second substantially triangular prism is optically coupled to the second planar surface of the first substantially triangular prism;
    wherein a beam of light that is incident to the first planar surface of the first substantially triangular prism is reflected at the optical coupling between the first substantially triangular prism and the second substantially triangular prism and focused through the third curved surface of the first substantially triangular prism.

8. An optical assembly comprising:
    a first optical element formed as a first substantially triangular prism from a section of a monolithic lens, the first substantially triangular prism having a first planar surface for receiving an incident optical beam, a second planar surface, and a third convex surface for emitting reflected light of the optical beam, wherein the second planar surface is opposite a first angle formed by the first planar surface and the third convex surface; and
    a second optical element formed as a second substantially triangular prism having a first planar surface, a second planar surface, and a third planar surface, wherein the second planar surface of the second substantially triangular prism is opposite a second angle formed by the first planar surface and the third planar surface of the second substantially triangular prism, and wherein the second planar surface of the second substantially triangular prism is adjacent the second planar surface of the first substantially triangular prism.

9. The optical assembly of claim 8 wherein the second substantially triangular prism comprises a right angle prism.

10. The optical assembly of claim 8 wherein there is no adjoining interface between the second and third planar surfaces of the first substantially triangular prism.

11. The optical assembly of claim 8 wherein the reflected portion of the incident optical beam does not cross an adjoining interface.

* * * * *